(12) United States Patent
Nguyen et al.

(10) Patent No.: US 11,300,213 B1
(45) Date of Patent: Apr. 12, 2022

(54) FLOATING YOKE CONNECTION

(71) Applicant: Emerson Automation Solutions Final Control US LP, Houston, TX (US)

(72) Inventors: Kenneth Nguyen, Reno, NV (US); Peter Woodhead, Brisbane (AU); Haley Colton, Houston, TX (US); Robert Ohlson, Houston, TX (US); Rob Corrigan, Houston, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 0 days.

(21) Appl. No.: 17/180,463

(22) Filed: Feb. 19, 2021

(51) Int. Cl.
  *F16K 3/02* (2006.01)
  *F16K 3/316* (2006.01)
  *F16K 3/312* (2006.01)
  *F16K 27/04* (2006.01)

(52) U.S. Cl.
  CPC ............ *F16K 3/316* (2013.01); *F16K 3/0281* (2013.01); *F16K 3/312* (2013.01); *F16K 27/044* (2013.01)

(58) Field of Classification Search
  CPC ........ F16K 3/316; F16K 3/0281; F16K 3/312; F16K 27/044
  USPC ......................................... 251/174, 326–329
  See application file for complete search history.

(56) References Cited

U.S. PATENT DOCUMENTS

| | | | |
|---|---|---|---|
| 1,612,039 A | 12/1926 | Miller | |
| 2,360,389 A * | 10/1944 | Bergman | F16K 11/074 138/94.5 |
| 2,669,416 A | 2/1954 | Hilton | |
| 2,731,282 A | 1/1956 | McManus et al. | |
| 2,774,371 A | 12/1956 | Grannenfelt | |
| 2,829,862 A | 4/1958 | Wey | |
| 2,842,283 A | 7/1958 | Smith | |
| 2,992,817 A | 7/1961 | Templeton | |
| 3,319,661 A | 5/1967 | Shindler | |
| 3,333,816 A | 8/1967 | Williams et al. | |

(Continued)

FOREIGN PATENT DOCUMENTS

| | | |
|---|---|---|
| CA | 1086706 A | 9/1980 |
| CA | 1227473 A | 9/1987 |

(Continued)

OTHER PUBLICATIONS

Inventor XU, U.S. Appl. No. 62/798,750, Method of Characterization of Visible and/or Sub-Visible Particles in Biologics, filed Jan. 30, 2019, 96 pages, retrieved from U.S. Patent Office.

(Continued)

*Primary Examiner* — John Bastianelli
(74) *Attorney, Agent, or Firm* — Quarles & Brady LLP

(57) ABSTRACT

A clamp assembly to secure a yoke to a valve body of a knife gate valve is provided. The clamp assembly can include a bolt that is configured to extend through a first bushing, a first spring member, a first side wall of the yoke, the valve body, a second side wall of the yoke, a second spring member, and a second bushing. The clamp assembly can be configured to pin the yoke to the valve body, apply a pressure-containing preload to the valve body via the first and second bushings, and compress the first spring member between the first bushing and the first side wall of the yoke and the second spring member between the second bushing and the second side wall of the yoke.

14 Claims, 4 Drawing Sheets

(56) References Cited

U.S. PATENT DOCUMENTS

| | | | |
|---|---|---|---|
| 3,589,670 A | 6/1971 | Armstrong | |
| 3,659,822 A * | 5/1972 | Nagy | F16K 3/312 |
| | | | 251/178 |
| 3,685,580 A | 8/1972 | DeVries | |
| 3,710,816 A | 1/1973 | Prince | |
| 3,743,244 A | 7/1973 | Dickenson et al. | |
| 3,746,303 A | 7/1973 | Grove et al. | |
| 3,765,647 A | 10/1973 | Grove et al. | |
| 3,768,774 A | 10/1973 | Baugh | |
| 3,799,187 A | 3/1974 | Armstrong | |
| 3,896,834 A | 7/1975 | Paul, Jr. | |
| 3,906,992 A | 9/1975 | Leach | |
| 3,917,223 A | 11/1975 | Sidler et al. | |
| 3,938,779 A | 2/1976 | Benjamin | |
| 3,993,092 A | 11/1976 | Still | |
| 4,009,727 A | 3/1977 | Bailey | |
| 4,026,001 A | 5/1977 | Jones | |
| 4,026,517 A | 5/1977 | Still | |
| 4,031,930 A | 6/1977 | Sutcliffe et al. | |
| 4,102,175 A | 7/1978 | Foster | |
| 4,146,989 A | 4/1979 | Vanus et al. | |
| 4,206,905 A | 6/1980 | Dobler | |
| 4,230,299 A | 10/1980 | Pierce, Jr. | |
| 4,239,469 A | 12/1980 | Kemp | |
| 4,279,402 A | 7/1981 | Wey et al. | |
| 4,288,105 A * | 9/1981 | Press | F16L 23/026 |
| | | | 285/24 |
| 4,314,579 A | 2/1982 | Wheatley et al. | |
| 4,364,542 A | 12/1982 | Meyer | |
| 4,377,274 A | 3/1983 | Mayhew, Jr. | |
| 4,429,710 A | 2/1984 | Grieves et al. | |
| 4,434,967 A | 3/1984 | Vanderburg | |
| 4,441,726 A | 4/1984 | Uhl | |
| 4,451,047 A | 5/1984 | Herd et al. | |
| 4,516,752 A | 5/1985 | Babbitt et al. | |
| 4,516,921 A | 5/1985 | Kemp | |
| 4,522,224 A | 6/1985 | Stadler et al. | |
| 4,524,950 A | 6/1985 | Vitas et al. | |
| 4,546,788 A | 11/1985 | Stadler et al. | |
| 4,552,369 A | 11/1985 | Stewart et al. | |
| 4,558,669 A | 12/1985 | Kemp | |
| 4,583,569 A | 4/1986 | Ahistone | |
| 4,603,864 A | 8/1986 | Raftis | |
| 4,646,407 A | 3/1987 | Mayhew, Jr. | |
| 4,646,777 A | 3/1987 | Stadler et al. | |
| 4,664,139 A | 5/1987 | Pfeiffer | |
| 4,679,770 A | 7/1987 | Liberman | |
| 4,681,329 A | 7/1987 | Contin | |
| 4,688,597 A * | 8/1987 | Clarkson | F16K 3/0227 |
| | | | 137/375 |
| 4,703,915 A | 11/1987 | King | |
| 4,718,637 A | 1/1988 | Contin | |
| 4,730,807 A | 3/1988 | Miller | |
| 4,742,990 A | 5/1988 | Stadler et al. | |
| 4,765,361 A | 8/1988 | Clifford | |
| 4,773,440 A | 9/1988 | Yanagawa et al. | |
| 4,773,627 A | 9/1988 | King et al. | |
| 4,798,365 A | 1/1989 | Mayhew | |
| 4,860,704 A | 8/1989 | Slaughter | |
| 4,881,719 A | 11/1989 | Bowman | |
| 4,886,241 A | 12/1989 | Davis et al. | |
| 4,895,181 A | 1/1990 | McKavanagh | |
| 4,949,939 A | 8/1990 | Almada | |
| 4,962,785 A * | 10/1990 | Clifford | F16K 3/0281 |
| | | | 137/383 |
| 5,013,009 A | 5/1991 | Nelson | |
| 5,014,730 A | 5/1991 | Fye | |
| 5,020,776 A | 6/1991 | Owens et al. | |
| 5,029,812 A | 7/1991 | Haynes | |
| 5,037,064 A | 8/1991 | Pond | |
| 5,056,758 A | 10/1991 | Bramblet | |
| 5,062,439 A | 11/1991 | Butler et al. | |
| 5,062,857 A | 11/1991 | Berringer et al. | |
| 5,082,247 A | 1/1992 | Owens et al. | |
| 5,137,261 A | 8/1992 | Clifford | |
| 5,150,881 A | 9/1992 | McKavanagh | |
| 5,154,397 A | 10/1992 | Thomas et al. | |
| 5,178,180 A | 1/1993 | Parris et al. | |
| 5,192,051 A | 3/1993 | Roberson | |
| 5,197,512 A | 3/1993 | Lev | |
| 5,205,317 A | 4/1993 | Neuerberg et al. | |
| 5,205,537 A | 4/1993 | Pfeiffer | |
| 5,236,345 A | 8/1993 | Nevrekar | |
| 5,244,183 A | 9/1993 | Calvin et al. | |
| 5,255,893 A | 10/1993 | Peterson | |
| 5,271,426 A | 12/1993 | Clarkson et al. | |
| 5,291,912 A | 3/1994 | Comeaux | |
| 5,295,659 A | 3/1994 | Steele | |
| 5,295,661 A | 3/1994 | Roussel | |
| 5,297,777 A | 3/1994 | Yie | |
| 5,338,006 A | 8/1994 | McCutcheon et al. | |
| 5,341,835 A | 8/1994 | Lanning, II | |
| 5,368,276 A | 11/1994 | Pfeiffer | |
| 5,370,149 A * | 12/1994 | Clarkson | F16K 3/0281 |
| | | | 137/375 |
| 5,375,812 A | 12/1994 | Kent | |
| 5,413,140 A | 5/1995 | Kimpel et al. | |
| 5,549,278 A | 8/1996 | Sidler | |
| 5,653,423 A | 8/1997 | Young et al. | |
| 5,660,417 A * | 8/1997 | Reeves | F16L 23/18 |
| | | | 116/201 |
| 5,662,308 A | 9/1997 | Nevrekar | |
| 5,727,775 A | 3/1998 | Rodger et al. | |
| 5,836,569 A | 11/1998 | Wurangian | |
| 5,890,700 A | 4/1999 | Clarkson et al. | |
| 5,908,044 A | 6/1999 | Kearns et al. | |
| 5,908,046 A | 6/1999 | Mosman | |
| 5,979,874 A | 11/1999 | Gambetta et al. | |
| 6,010,112 A | 1/2000 | Sidler | |
| 6,010,115 A | 1/2000 | Schlegel et al. | |
| 6,116,573 A | 9/2000 | Cornette et al. | |
| 6,279,875 B1 | 8/2001 | Chatufale | |
| 6,375,157 B1 | 4/2002 | VanDeLande | |
| 6,422,535 B1 | 7/2002 | Stone et al. | |
| 6,425,410 B1 | 7/2002 | Taylor | |
| 6,484,749 B1 * | 11/2002 | Lim | F16K 27/0218 |
| | | | 137/375 |
| 6,588,729 B1 | 7/2003 | Kimpel | |
| 6,726,178 B2 | 4/2004 | Grandage | |
| 6,935,618 B2 | 8/2005 | Welty et al. | |
| 6,957,816 B2 | 10/2005 | Blease et al. | |
| 6,959,908 B2 | 11/2005 | Isbitsky | |
| 6,959,912 B2 | 11/2005 | Reeves et al. | |
| 7,059,586 B2 | 6/2006 | Vanderberg et al. | |
| 7,306,201 B2 | 12/2007 | Lam | |
| 7,350,766 B2 | 4/2008 | Comstock et al. | |
| 7,431,264 B2 | 10/2008 | Leroux | |
| 7,458,559 B2 | 12/2008 | Blenkush | |
| 7,481,239 B2 | 1/2009 | McGuire et al. | |
| 7,815,170 B2 | 10/2010 | Devine, Jr. et al. | |
| 7,946,556 B1 | 5/2011 | Trott | |
| 7,975,983 B2 | 7/2011 | Comeaux et al. | |
| 8,056,882 B2 | 11/2011 | Ohlson et al. | |
| 8,091,861 B2 | 1/2012 | Nesje | |
| 8,220,778 B2 | 7/2012 | Langmesser et al. | |
| 8,327,870 B2 | 12/2012 | Sidler | |
| 8,365,760 B2 | 2/2013 | Sidler | |
| 8,727,316 B1 | 5/2014 | Miao et al. | |
| 8,840,085 B2 | 9/2014 | Choo et al. | |
| 9,091,351 B2 | 7/2015 | Deocampo et al. | |
| 9,249,888 B2 | 2/2016 | McEvoy et al. | |
| 9,261,196 B2 | 2/2016 | McEvoy et al. | |
| 9,360,122 B2 | 6/2016 | Kennedy | |
| 9,416,881 B2 | 8/2016 | Takeda et al. | |
| 9,528,612 B2 | 12/2016 | Zellweger et al. | |
| 9,604,260 B2 | 3/2017 | Vanderburg et al. | |
| 9,759,334 B2 | 9/2017 | Hunter et al. | |
| 9,777,846 B2 | 10/2017 | Goodwin et al. | |
| 9,784,373 B2 | 10/2017 | Puetz et al. | |
| 9,809,382 B2 | 11/2017 | Marchesini | |
| 9,845,890 B2 | 12/2017 | Paez | |
| 9,885,420 B2 | 2/2018 | Sundararajan | |
| 10,054,238 B2 | 8/2018 | Watterodt et al. | |
| 10,077,844 B2 | 9/2018 | Parks, Jr. | |

(56) References Cited

U.S. PATENT DOCUMENTS

| | | |
|---|---|---|
| 10,100,936 B2 | 10/2018 | Gradle |
| 10,161,529 B2 | 12/2018 | Nguyen et al. |
| 10,167,961 B2 | 1/2019 | Nguyen et al. |
| 10,274,089 B2 | 4/2019 | Nguyen et al. |
| 10,281,047 B2 | 5/2019 | Scattini |
| 10,323,755 B2 | 6/2019 | Ruelland et al. |
| 10,436,331 B2 | 10/2019 | Frye et al. |
| 10,451,187 B2 | 10/2019 | Roberts |
| 10,533,667 B2 | 1/2020 | Hoang et al. |
| 10,677,362 B2 | 6/2020 | Kennedy |
| 10,683,941 B2 | 6/2020 | Lah et al. |
| 10,746,306 B2 | 8/2020 | Parsons et al. |
| 10,890,261 B2 | 1/2021 | Reilly et al. |
| 10,900,575 B2 | 1/2021 | McEvoy et al. |

FOREIGN PATENT DOCUMENTS

| | | |
|---|---|---|
| CA | 1307514 C | 9/1992 |
| CA | 2131110 C | 3/1995 |
| CA | 2141005 C | 8/1995 |
| CA | 2196860 C | 8/1997 |
| CA | 2266407 C | 4/1998 |
| CA | 2246922 C | 12/2007 |
| CA | 2594083 C | 4/2015 |
| CA | 3011532 C | 5/2019 |
| CN | 203477382 U | 3/2014 |
| CN | 203532804 U | 4/2014 |
| CN | 103644315 B | 2/2016 |
| CN | 103867739 B | 3/2016 |
| CN | 104482235 B | 1/2017 |
| CN | 104613188 B | 11/2017 |
| CN | 210128090 U | 3/2020 |
| CN | 210218729 U | 3/2020 |
| CN | 210344346 U | 4/2020 |
| CN | 109282048 B | 5/2020 |
| EP | 0171693 B1 | 6/1990 |
| EP | 0409519 B1 | 6/1994 |
| EP | 0895011 B1 | 9/2004 |
| EP | 2210022 B1 | 3/2013 |
| EP | 2743550 B1 | 3/2015 |
| EP | 2396578 B1 | 5/2015 |
| EP | 2216572 B1 | 8/2015 |
| EP | 2947359 B1 | 7/2017 |
| EP | 2839191 B1 | 11/2017 |
| EP | 2893229 B1 | 4/2018 |
| EP | 2247879 B1 | 8/2018 |
| EP | 3143313 B1 | 9/2018 |
| EP | 1869350 B1 | 10/2018 |
| EP | 3120054 B1 | 7/2020 |
| EP | 3350490 B1 | 9/2020 |
| KR | 0166598 B1 | 3/1999 |
| KR | 100809640 B1 | 3/2008 |
| KR | 101300891 B1 | 8/2013 |
| KR | 101316000 B1 | 10/2013 |
| KR | 101324566 B1 | 11/2013 |
| KR | 101999528 B1 | 7/2019 |

OTHER PUBLICATIONS

Inventor Kay, U.S. Appl. No. 62/798,751, Ultrasonic Position Sensing System for Medical Devices, Orthopedic Drill or Driver, and Method of Performing Surgery, filed Jan. 30, 2019, 55 pages, retrieved from U.S. Patent Office.

Inventor Benenato, U.S. Appl. No. 62/798,752, Sterol Analogs and Uses Thereof, filed Jan. 30, 2019,181 pages, retrieved from U.S. Patent Office.

Inventor Kim, U.S. Appl. No. 62/798,753, Learning Method and Learning Device for Generating Training Data Material From Virtual Data on Virtual World By Using Generative Adversarial Network, To Thereby Reduce Annotation Cost Required in Training Processes of Neural Network For Autonomous Driving, filed date Jan. 30, 2019, 45 pages, retrieved from U.S. Patent Office.

Inventor Siddiqui, U.S. Appl. No. 62/798,754, "No GPS" Technology, filed Jan. 30, 2019, 14 pages, retrieved from U.S. Patent Office.

Inventor Masaoka, U.S. Appl. No. 62/798,756, Display Device, filed Jan. 30, 2019, 49 pages retrieved from U.S. Patent Office.

Inventor Jakubowski, U.S. Appl. No. 62/798,757, To-Go Cubby Unit, filed Jan. 30, 2019, 58 pages, retrieved from U.S Patent Office.

Inventor Rabito, U.S. Appl. No. 62/798,758, Tension Device for Ventricular Remodeling and Treatment of Heart Failure, 48 pages, retrieved from U.S. Patent Office.

\* cited by examiner

FLOATING YOKE CONNECTION

RELATED APPLICATIONS

Not Applicable.

BACKGROUND

Gate valves or knife gate valves are often used to control the flow of fluid, such as process fluid in a pipeline. These valves include a housing having a fluid passageway. The gate is configured to slide within the housing, can be supported by a gate support structure, and can be controlled via a gate actuation mechanism. The gate support structure and actuation mechanism can be secured to the housing via a yoke assembly.

SUMMARY

Some embodiments of the invention provide a knife gate valve. The knife gate valve can include first and second valve body portions, a yoke, and first and second clamp assemblies. The first valve body portion can be on a first axial side of the knife gate valve and the second valve body portion can be on a second axial side of the knife gate valve, engaged with the first valve body portion to slidingly receive a knife gate. The yoke can include a first leg extending on a first lateral side of the knife gate valve, and a second leg extending on a second lateral side of the knife gate valve. Each of the first and second legs can include a first side wall on the first axial side of the knife gate valve, opposite the first valve body portion from the second valve body portion, and a second side wall on the second axial side of the knife gate valve, opposite the second valve body portion from the first valve body portion. The first clamp assembly can extend through the first leg, the first valve body portion, and the second valve body portion to secure the yoke to the first and second valve body portions on the first lateral side of the knife gate valve. The second clamp assembly can extend through the second leg, the first valve body portion, and the second valve body portion to secure the yoke to the first and second valve body portions on the second lateral side of the knife gate valve. Each of the first and second clamp assemblies can include a bolt, first and second bushings, and first and second spring members. The first bushing can be on the first axial side of the knife gate valve. The second bushing can be on the second axial side of the knife gate valve. The first spring member can be arranged between the first bushing and the first valve body portion. The second spring member can be arranged between the second bushing and the second valve body portion. The bolt can extend through the first and second bushings, the first and second valve body portions, and the associated first or second leg of the yoke to apply a pressure-containing preload to the first and second valve body portions via the first and second bushings. The first and second spring members can be compressed by the bolt to apply a resilient spring force to the associated first or second leg of the yoke.

In some embodiments, a knife gate valve can include first and second clamp assemblies. Each of the first and second clamp assemblies can include first and second bushings. Each of the first and second bushings can include a barrel that extends through an associated first or second leg of a yoke to engage an associated first or second valve body portion. Each of the first and second bushings can also include a flange that extends radially from the barrel opposite the associated first or second leg from the associated first or second valve body portion.

In some embodiments, a knife gate valve can include a spring member seated between a flange of a bushing and a leg of a yoke.

In some embodiments, a knife gate valve can include a bolt that passes through a spring member.

In some embodiments, a knife gate valve can include a yoke having first and second legs having U-shaped cross sections. Respective portions of first and second valve body portions can be received within the U-shaped cross section in alignment with respective first and second clamp assemblies.

In some embodiments, a knife gate valve can include first and second valve body portions that collectively define a first projection on a first lateral side of the knife gate valve and a second projection on a second lateral side of the knife gate valve. The first projection can be received in a U-shaped cross section of a first leg of a yoke and can receive a first clamp assembly. The second projection can be received in a U-shaped cross section of a second leg of the yoke and can receive a second clamp assembly.

In some embodiments, a knife gate valve can include first and second body portions that define a central slot that can slidingly receive the knife gate and a top wall of the knife gate valve at the central slot. First and second projections can project above the top wall.

In some embodiments, a knife gate valve can include first and second projections that include a recessed portion at each of first and second axial sides of the knife gate valve. First and second legs of a yoke can extend into alignment with the recessed portions to be secured by first and second clamp assemblies.

In some embodiments, a knife gate valve can include an axial gap provided on a first lateral side of the knife gate valve, between a first leg of a yoke and each of first and second valve body portions of the knife gate valve. A second axial gap can be provided on a second lateral side of the knife gate valve, between a second leg of the yoke and each of the first and second valve body portions. First and second spring members can be arranged opposite the associated first or second leg from the associated axial gap.

In some embodiments, a knife gate valve can include first and second clamp assemblies, each having an associated first and second bushing. A length of a barrel of the associated first or second bushing can be longer than a total thickness of an axial gap, a material thickness of a leg of a yoke, and a minimum, compressed thickness of an associated first or second spring member.

In some embodiments, a knife gate valve can include first and second clamp members, which include first and second spring members. The first and second spring members can permit first and second legs of a yoke to translate in an axial direction upon loading of a gate by a process flow at the knife gate valve.

In some embodiments, a knife gate valve can include a yoke fastened to first and second valve body portions only by first and second clamp assemblies.

In some embodiments, a knife gate valve can include first and second clamp assemblies. The first and second clamp assemblies can provide a pinned connection between a yoke and first and second valve body portions.

In some embodiments, a knife gate valve can include first and second spring members. One or more of the first or second spring members can be a Belleville washer.

Some embodiments of the invention provide a clamp assembly to secure a yoke to a valve body of a knife gate valve. The clamp assembly can include a bolt, first and second bushings, and first and second spring members. The first bushing can be configured to be disposed on a first axial side of the valve body. The second bushing can be configured to be disposed on a second axial side of the valve body. The first spring member can be configured to be arranged between the first bushing and the valve body, opposite a first side wall of a leg of the yoke from the valve body. The second spring member can be configured to be arranged between the second bushing and the valve body, opposite a second side wall of the leg of the yoke from the valve body. The bolt can be configured to extend through the first bushing, the first spring member, the first side wall of the yoke, the valve body, the second side wall of the yoke, the second spring member, and the second bushing to: pin the yoke to the valve body; apply a pressure-containing preload to the valve body via the first and second bushings; compress the first spring member between the first bushing and the first side wall of the yoke; and compress the second spring member between the second bushing and the second side wall of the yoke.

In some embodiments, a clamp assembly can include first and second bushings. Each of the first and second bushings can include a barrel and a flange. Each of the barrels can be configured to extend through an associated first or second side wall of a yoke and an associated first or second spring member, to bear on a valve body at an associated first or second axial side of the valve body. Each of the flanges can be configured to compress the associated first or second spring member against the associated first or second side wall of the yoke.

Some embodiments of the invention provide a yoke assembly for a knife gate valve that includes a knife gate and a valve body formed from first and second valve body portions. The yoke assembly can include a first leg, and a second leg. The first leg can be configured to extend on a first lateral side of the valve body. The second leg can be configured to extend on a second lateral side of the valve body. Each of the first and second legs can include a first side wall on a first axial side of the yoke assembly and a second side wall on a second axial side of the yoke assembly. Each of the first and second legs can be configured to receive a respective portion of the valve body between the associated first and second side walls for a pinned connection between the first and second legs and the respective portion of the valve body.

In some embodiments, a yoke assembly can include a pinned connection between first and second legs and a valve body. The pinned connection can be provided by a respective clamp assembly. Each clamp assembly can include a bolt, first and second bushings, and first and second spring members. The first bushing can be on a first axial side of the yoke assembly. The second bushing can be on a second axial side of the yoke assembly. The first spring member can be arranged between the first bushing and a first side wall of the associated first or second leg. The second spring member can be arranged between the second bushing and a second side wall of the associated first or second leg. The bolt can extend through the first and second bushings, first and second valve body portions, the first and second spring members, and the first and second side walls of the associated first or second leg and configured to apply a pressure-containing preload to the first and second valve body portions via the first and second bushings.

In some embodiments, a yoke assembly can include first and second legs. Each of the first and second legs can have a U-shaped cross section that is configured to receive a respective portion of a valve body.

In some embodiments, a yoke assembly can include first and second legs. The first and second legs can angle obliquely from a pinned connection toward a bridge portion, relative to a direction of a sliding movement of a knife gate.

Some embodiments of the invention provide a method of installing a knife gate valve. The method can include assembling a first pinned connection to secure a first leg of a yoke to a valve body of the knife gate valve, the first pinned connection applying a pressure-containing preload to first and second valve body portions of the valve body at a first lateral side of the valve body. The method can also include assembling a second pinned connection to secure a second leg of a yoke to the valve body, the second pinned connection applying a pressure-containing preload to the first and second valve body portions of the valve body at a second lateral side of the valve body. The first and second pinned connections can secure the yoke to the valve body to support a knife gate for sliding movement within the valve body.

In some embodiments, a method of installing a knife gate valve can include assembling a first pinned connection to secure a first leg of a yoke to a valve body of the knife gate valve and assembling a second pinned connection to secure a second leg of the yoke to the valve body. The yoke can be fastened to the valve body only at the first and second pinned connections.

In some embodiments, a method of installing a knife gate valve can include assembling a first pinned connection to secure a first leg of a yoke to a valve body of the knife gate valve and assembling a second pinned connection to secure a second leg of the yoke to the valve body. The first pinned connection can be provided by a first clamp assembly and the second pinned connection can be provided by a second clamp assembly. Each of the first and second clamp assemblies can include a bolt, first and second bushings, and first and second spring members.

In some embodiments, a method of installing a knife gate valve can include, for each of two clamp assemblies, arranging a first bushing on a first axial side of a valve body, arranging a second bushing on a second axial side of the valve body, arranging a first spring member between a flange of the first bushing and a first side wall of an associated first or second leg, and arranging a second spring member between a flange of the second bushing and a second side wall of the associated first or second leg. The method can also include extending a bolt through the first and second bushings, first and second valve body portions, the first and second spring members, and first and second side walls of the associated first or second leg, and tightening the bolt to apply the pressure-containing preload to the first and second valve body portions via the first and second bushings and to compress the first and second spring members against the first and second side walls, respectively.

In some embodiments, a method of installing a knife gate valve can include assembling a yoke, including welding first and second legs to a bridge portion that extends between the first and second legs to support a knife gate for sliding movement within a valve body of the knife gate valve. The first and second legs can extend at respective oblique angles relative to the bridge portion.

In some embodiments, a method of installing a knife gate valve can include assembling a first pinned connection to secure a first leg of a yoke to a valve body of the knife gate valve and assembling a second pinned connection to secure a second leg of the yoke to the valve body. Assembling the first pinned connection can include inserting a first protrusion of the valve body between first and second side walls of the first leg. Assembling the second pinned connection can include inserting a second protrusion of the valve body between first and second side walls of the second leg.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
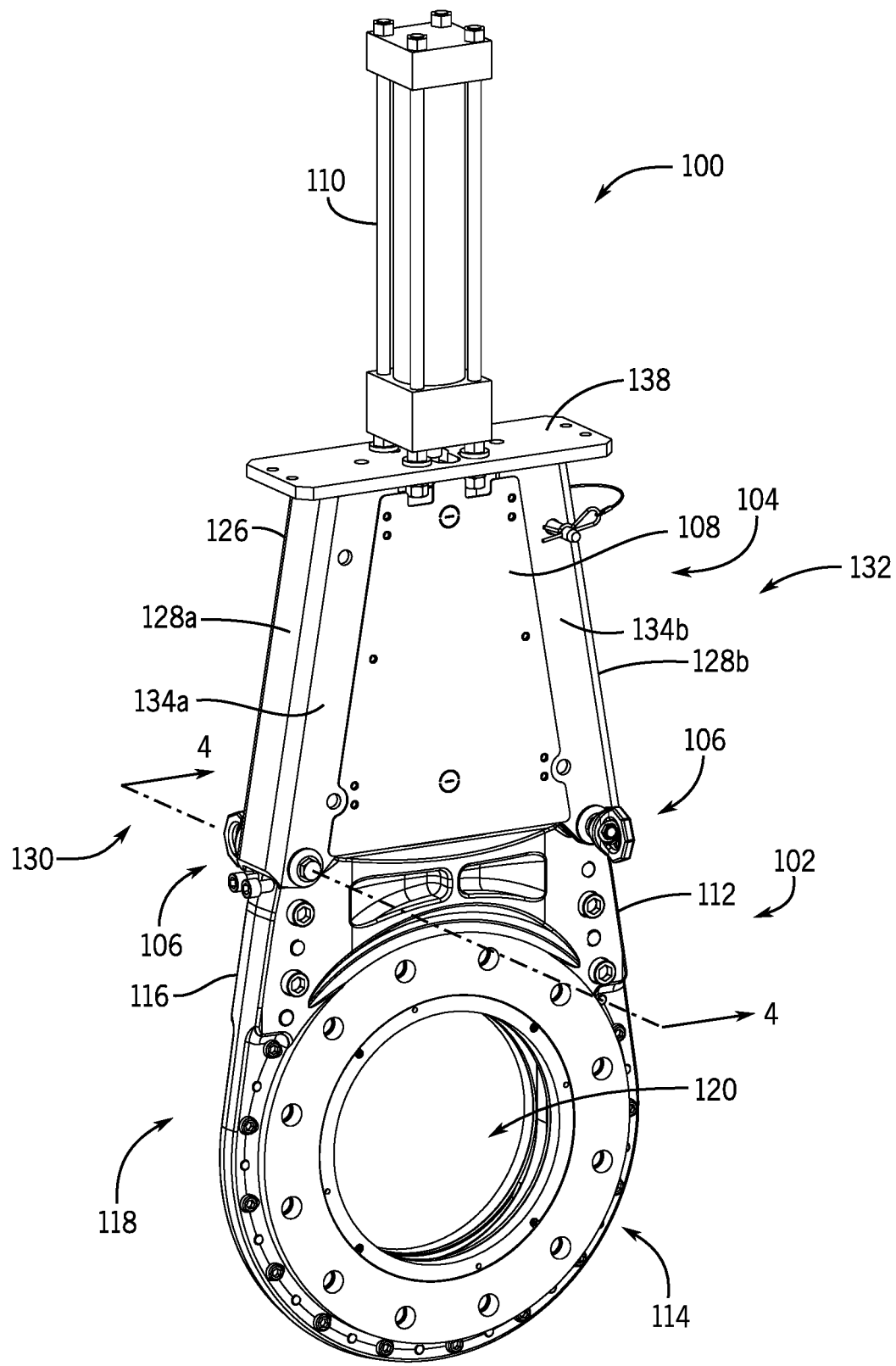
FIG. 1 is an isometric view of a knife gate valve according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

Also as used herein, unless otherwise specified or limited, the term "U-shaped" specifies a shape that includes a base portion, with at least two leg portions extending in generally similar directions from the base portion. In some embodiments, a "U-shaped" member can include leg portions extending from opposite ends of the base portion at substantially right angles to the base portion (i.e., deviating from right angles by less than 5 degrees), with or without curved, chamfered, or otherwise non-square connecting regions between the leg portions and the base portion. In some embodiments, a "U-shaped" member can include leg portions that extend as part of a continuous (e.g., non-angled) curve from either end of a straight or curved base portion. Thus, for example, some "U-shaped" members may have half-rectangular, semi-circular, or other similar cross-sectional profiles." Further, some "U-shaped" members may include a first leg that is longer than a second leg.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In conventional designs, a valve body of a knife gate valve generally includes first and second valve body portions that can be secured to each other via a body fastening assembly. Further, a yoke assembly can be fastened to the valve body by a yoke fastening assembly, which is separate from the body fastening assembly. As briefly described above, knife gate valves often include a gate support structure and a gate actuation mechanism to actuate a knife gate of the knife gate valve. A yoke assembly can be a part of the gate support structure, including to support the gate actuation mechanism and the knife gate itself relative to an associated valve body. With this arrangement, conventional yokes can often allow tilting of the gate during loading of the gate by a process flow at the knife gate valve.

Embodiments of the invention generally relate to a knife gate valve that includes a yoke assembly that is fastened to a valve body via first and second pinned connections, including as described in further detail below. Notably, in some cases, a yoke assembly can be fastened to a valve body at a connection (e.g., a pinned connection) that is also used to apply a pressure-containing preload to the valve body to sealingly secure a first valve body portion relative to a second valve body portion. Thus, for example, the same fastener connection that can secure a yoke to a valve body can also help to provide leak free operation of the valve body. Further, in some cases, one or more spring members can apply a resilient spring force to a leg of a yoke at an axial clearance gap relative to a valve body, as can be useful to reduce the amount of tilt of a gate during loading of the gate and promote axial translation of the gate, thereby potentially reducing concentrated stress applied to the gate during operation.

FIG. 1 illustrates a knife gate valve 100 according to one embodiment of the invention. The knife gate valve 100 includes a valve body assembly 102 and a yoke assembly 104. In the illustrated embodiment, the yoke assembly 104 is fastened to the valve body assembly 102 via first and second clamp assemblies 106. In general, a yoke assembly can facilitate securing a gate actuation mechanism to a valve body, while also helping to protect and guide movement of the gate. For example, FIG. 1 illustrates a pair of gate guards 108 and a gate support structure 110 of a gate actuation mechanism (not fully shown) secured to the valve body assembly 102 via the yoke assembly 104, to protect and move a gate 122 (see, for example, FIG. 4).

Continuing, the valve body assembly 102 includes a first valve body portion 112 on a first axial side 114 off the knife gate valve 100 and a second valve body portion 116 on a second axial side 118 of the knife gate valve 100. The first valve body portion 112 is engaged with the second valve body portion 116 to slidably receive the gate 122 of the knife gate valve 100, and to define a passageway 120 having an axis along which process fluid can flow. In the illustrated example, the valve body portions 112, 116 are symmetrical across a frontal plane defined by the gate 122 and across a sagittal plane that is perpendicular to the frontal plane and includes the flow axis of the valve 100. However, a variety of other configurations are also possible.

Figure 2:
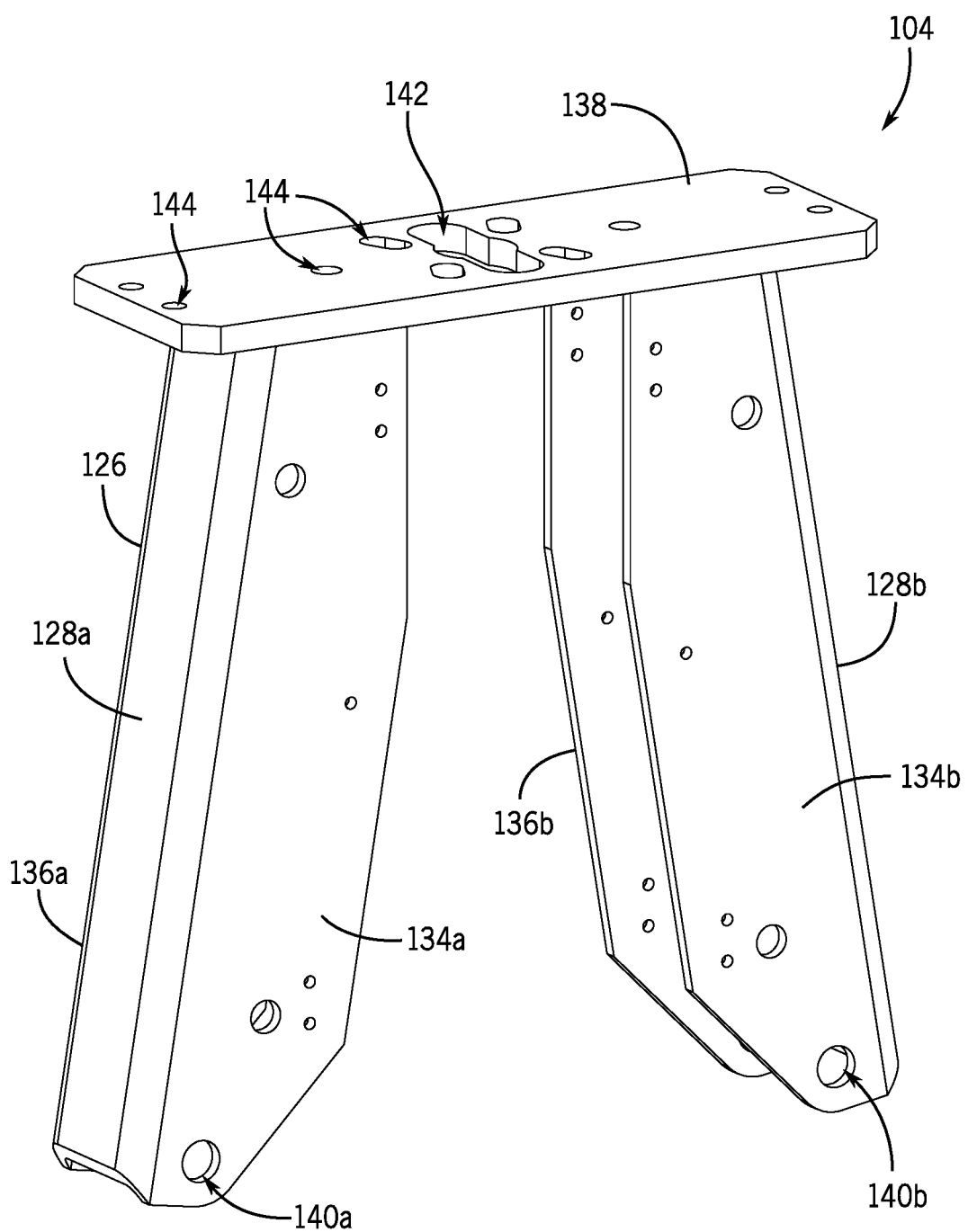
FIG. 2 is an isometric view of a yoke assembly of the knife gate valve of FIG. 1.

Referring to FIGS. 1 and 2, the yoke assembly 104 includes a yoke body 126. The yoke body 126 includes a first leg 128a and a second leg 128b. As shown in FIG. 1, the first leg 128a extends toward a first lateral side 130 of the knife gate valve 100 and the second leg 128b extends toward a second lateral side 132 of the knife gate valve 100. In the illustrated embodiment, the first and second legs 128a, 128b are generally symmetric. Therefore, description of the first leg 128a below also generally applies to the second leg 128b, and similar features of the first and second legs 128a, 128b are identified with like reference numerals and are distinguished by the suffixes "a" and "b" in the figures, although some embodiments may not necessarily illustrate this symmetry.

In particular, in the illustrated embodiment, the first leg 128a includes a first side wall 134a and a second side wall 136a. The first side wall 134a is disposed on the first axial side 114 of the knife gate valve 100, opposite the first valve body portion 112 from the second valve body portion 116, and engages one of the gate guards 108. Similarly, the second side wall 136a is disposed on the second axial side 118 of the knife gate valve 100, opposite the second valve body portion 116 from the first valve body portion 112, and engages the other gate guard 108.

The yoke body 126 further includes a bridge portion 138. The bridge portion 138 extends between the first leg 128a and the second leg 128b and can support the knife gate for sliding movement relative to the valve body assembly 102. In some embodiments, each of the first leg 128a and the second leg 128b can be welded to the bridge portion 138, which may result in simpler and more robust manufacturing than conventional designs. However, a variety of other methods may also be used to produce a similar or otherwise applicable yoke body, including yoke bodies that do not include bridges (e.g., with legs that extend at oblique, or other, angles relative to a direction of movement of a knife gate, to be joined directly together opposite a connection of the legs to the valve body).

With continued reference to FIG. 2, each of the first side wall 134a and the second side wall 136a include respective through holes 140a that are axially aligned (only a single through hole 140a is visible in FIG. 2). Additionally, each of the first and second legs 128a, 128b are angled obliquely with respect to the bridge portion 138. In particular, each of the first and second legs 128a, 128b extend, and are angled laterally outwardly, from the bridge portion 138. In the illustrated embodiment, the bridge portion 138 includes an opening 142 that a portion of the gate actuation mechanism can extend through and a plurality of mount features 144 to facilitate securing the yoke assembly 104 to the gate actuation mechanism.

Still referring to FIG. 2, each of the first and second legs 128a, 128b defines a U-shaped cross section. When the valve 100 is assembled, as also discussed below, each of the respective portions of the first valve body portion 112 and the second valve body portion 116 can be received within the U-shaped cross section in alignment with the first and second clamp assemblies 106 (see, for example, FIGS. 3 and 4). In some embodiments, legs of a yoke assembly, such as the legs 128a, 128b, for example, can be manufactured from pre-formed tubing having a square or rectangular cross section. In other embodiments, legs of a yoke assembly can be manufactured from a material that is bent or otherwise formed to create a U-shaped profile. Generally, as also discussed above, such a U-shaped profile can include rounded or angled geometry.

Figure 3:
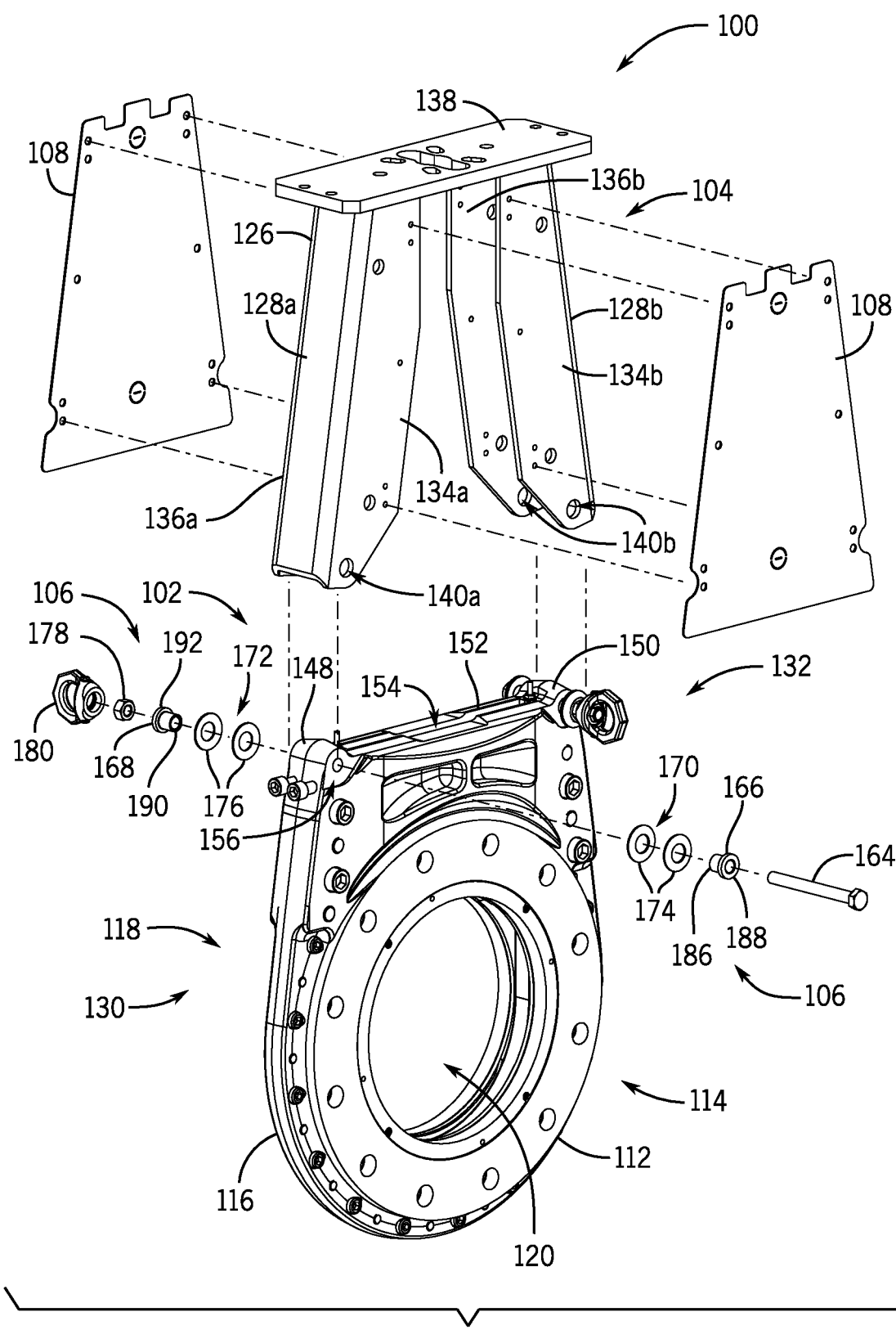
FIG. 3 is a partially exploded isometric view of a clamp assembly and the yoke assembly of the knife gate valve of FIG. 1.

As shown in FIG. 3 in particular, the valve body assembly 102 further includes a first projection 148 on the first lateral side 130 of the knife gate valve 100 and a second projection 150 on the second lateral side 132 of the knife gate valve 100. Each of the first and second projections 148, 150 are collectively defined by the first valve body portion 112 and the second valve body portion 116. Each of the first and second valve body portions 112, 116 also form a top wall 152 that defines a central slot 154 therein that can slidingly receive the knife gate. As illustrated in FIG. 3, each of the first projection 148 and the second projection 150 extend above the top wall 152. Thus, in the illustrated example, the projections 148, 150 define an uppermost extension of the valve body assembly 102 (from the illustrated perspective) or, in other words, the furthest extension of the chest portion of the valve body assembly 102 away from the passageway 120.

The first and second projections 148, 150 can provide particularly beneficial attachment features for securing the yoke assembly 104 to the valve body assembly 102. As shown in FIG. 3, each of the first and second projections 148, 150 are formed generally at the portion of the valve body assembly 102 that engages the yoke assembly 104. Thus, for example, the first projection 148 can be received in the U-shaped cross section of the first leg 128a and can receive one of the two clamp assemblies 106. Similarly, the second projection 150 can be received in the U-shaped cross section of the second leg 128b and can receive the other of the two clamp assemblies 106. Although a U-shaped cross section can be particularly useful, including for reasons discussed below, other cross-sectional profiles for one or more legs of a yoke are possible.

Figure 4:
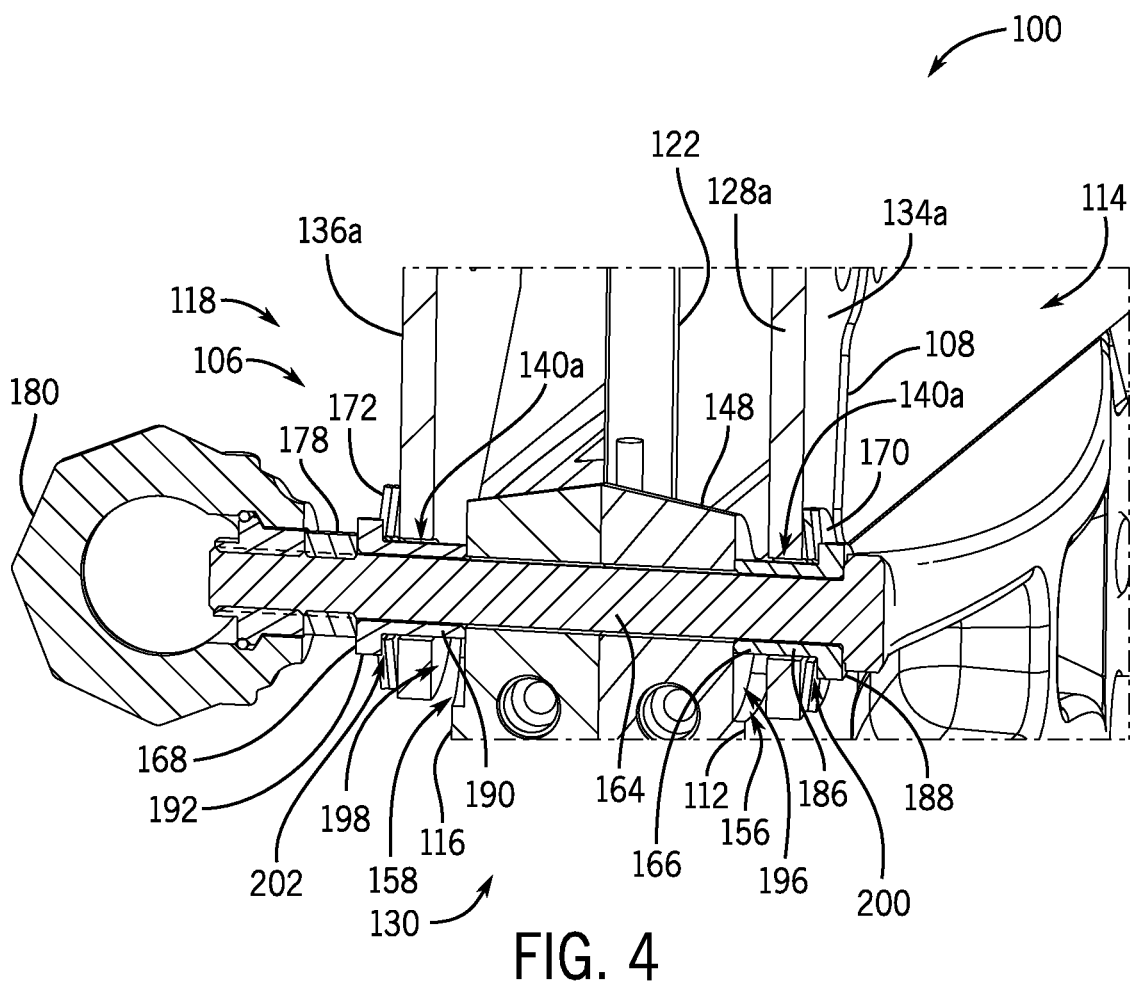
FIG. 4 is a cross-sectional isometric partial view of the clamp assembly secured to the yoke assembly and the knife gate valve taken along line 4-4 of FIG. 1.

In some embodiments, other features can also (or alternatively) be provided. For example, as shown in FIG. 4 in particular, each of the first and second projections 148, 150 includes a first recessed portion 156 formed on the first axial side 114 of the knife gate valve 100 and a second recessed portion 158 formed on the second axial side 118 of the knife gate valve 100 (only the first and second recessed portions 156, 158 of the first lateral side 130 of the knife gate valve 100 are visible in FIG. 4). In general, the first leg 128a (and similarly, the second leg 128b) extends proximate to and aligned with the recessed portions 156, 158 of the associated lateral side of the knife gate valve 100 to be secured by the clamp assembly 106.

With continued reference to FIG. 3, each clamp assembly 106 includes a bolt 164, a first bushing 166, a second bushing 168, a first spring member 170, and a second spring member 172. The first bushing 166 is disposed on the first axial side 114 of the knife gate valve 100 and the second bushing 168 is disposed on the second axial side 118 of the knife gate valve 100. The first spring member 170 is arranged between the first bushing 166 and the first valve body portion 112, and the second spring member 172 is arranged between the second bushing 168 and the second valve body portion 116.

Generally, in some embodiments, a clamp assembly, including the clamp assembly 106, can employ a spring member to occupy a clearance space or gap between a yoke assembly and one or more components of the clamp assembly, as may apply a compressive force against a yoke assembly of a knife gate valve to provide an improved structural assembly. In the illustrated embodiment, for example, the first spring member 170 is configured as first and second conical spring washers 174. Similarly, the second spring member 172 is configured as first and second conical spring washers 176. In other examples, spring members can include one or more Belleville washers, coned-disc springs, conical spring washers, disc springs, cupped spring washers, coil springs, or other components having elastic properties configured to resiliently store mechanical energy.

In some embodiments, it may be useful for the same fastener connection that secures a yoke assembly to a valve body assembly to also provide a pressure-containing preload to the valve body assembly. Thus, for example, a single clamp assembly can help serve multiple functions, preload connections can be made at particularly optimal locations on a valve body assembly, and a valve body assembly can be designed to include a chest portion of reduced size relative to conventional designs. With reference to FIGS. 3 and 4, for example, each bolt 164 of the pair of clamp assemblies 106 is configured to extend through the yoke assembly 104 at the respective through holes 140a, 140b of the first and second legs 128a, 128b. Additionally, the bolt 164 can extend through the first and second bushings 166, 168, the first and second valve body portions 112, 116, and the first and second spring members 170, 172. Thus, the clamp assemblies 106 can provide a pinned connection to secure the yoke assembly 104 to the valve body assembly 102. Further, by tightening a nut 178 (to the inside of a ring 180) onto a threaded end of the bolt 164, the bolt 164 can be made to apply a pressure-containing preload to the first and second valve body portions 112, 116 via the first and second bushings 166, 168. In some embodiments, a clamp assembly can include a bolt that can be tensioned relative to a valve body via other tightening means, such as via a threaded bushing, for example.

In some embodiments, to ensure appropriate preloading of a valve body assembly, it may be useful to configure a clamp assembly so that pressure-containing force is appropriately applied to the relevant valve body portions. For example, in the illustrated embodiment, the first bushing 166 includes a first barrel portion 186 that can extend through the associated first or second leg 128a, 128b of the yoke assembly 104 to engage the first valve body portion 112. The first bushing 166 also includes a first flange 188 that extends radially from the first barrel portion 186 opposite the associated first or second leg 128a, 128b from the first valve body portion 112, as can help to locate and retain the associated spring member 170. Similarly, the second bushing 168 includes a second barrel portion 190 that can extend through the associated first or second leg 128a, 128b of the yoke assembly 104 to engage the second valve body portion 116. The second bushing 168 also includes a second flange 192 that extends radially from the second barrel portion 190 opposite the associated first or second leg 128a, 128b from the second valve body portion 116, as can help to locate and retain the associated spring member 172.

With reference to FIG. 4, as described above, one of the clamp assemblies 106 extends through the first leg 128a to provide a pinned connection between the yoke assembly 104 and the valve body assembly 102. Likewise, though not visible in FIG. 4, the other clamp assembly 106 extends through the second leg 128b to provide a second pinned connection between the yoke assembly 104 and the valve body assembly 102. The pressure-containing preload provided from the bolt 164 to both of the first valve body portion 112 and the second valve body portion 116 via the first and second bushings 166, 168, secures the yoke assembly 104 relative to the valve body assembly 102, secures the first and second valve body portions 112, 116 relative to one another, and ensures a pressure-containing seal between the first and second valve body portions 112, 116. Further, under the force supplied by the bolt 164, each of the first and second spring members 170, 172 are compressed between the flanges 188, 192 and the legs 128a, 128b to apply a resilient spring force to the corresponding first or second leg 128a, 128b of the yoke body 126.

Still referring to FIG. 4, a plurality of clearance gaps are formed in an axial direction (i.e., parallel to a direction of flow through the passageway 120) as a result of manufacturing and assembly processes. For example, each of the recessed portions 156, 158 provide a narrowed width of the valve body assembly 102 within a corresponding securing area, such that the first lateral side 130 of the valve body assembly 102 can be easily received between the respective first and second side walls 134a, 136a of the leg 128a and the second lateral side 132 of the valve body assembly 102 can be easily received between the first and second side walls 134b, 136b of the leg 128b (see also FIG. 3). This effect can be seen in particular in FIG. 4: with the yoke assembly 104 initially installed on the valve body assembly 102, a first clearance gap 196 is formed between the first side wall 134a and the first valve body portion 112, in alignment with the narrowed portion 156 (e.g., directly axially outwardly therefrom). Similarly, a second clearance gap 198 is formed between the second side wall 136a and the second valve body portion 116, in alignment with the narrowed portion 158 (e.g., directly axially outwardly therefrom). In general, the first and second clearance gaps 196, 198 provide an axial gap to facilitate the assembly of the knife gate valve 100.

Further, the length of the barrel portions 186, 190 result in exterior gaps 200, 202 are provided outside the legs 128a, 128b, between the respective side walls 134a, 136a, and the respective flanges 188, 192 of the respective bushing 166, 168 (and similarly between at the second lateral side 132 side walls 134b, 136b). The gaps 200, 202 can also contribute to appropriate overall clearance between components and can thus facilitate easy assembly and operation of the valve 100. As shown in FIG. 4, and also discussed above, the first and second spring members 170, 172 are disposed within the corresponding exterior gaps and opposite the respective side wall 134a, 134b from the respective clearance gap 196, 198.

As well as providing various benefits relative to manufacturing and assembly processes, the gaps, including the first clearance gap 196, the second clearance gap 198, and the exterior gaps 200, 202 outside the legs 128a, 128b, provide a space for the gate 122 to translate axially within the yoke assembly 104 (i.e., shift parallel to the flow direction), including when the gate 122 is loaded by system pressure when closed. This improved ability for a gate to translate relative to a yoke structure can help to reduce a tilting motion of the gate, as compared to conventional configurations, which can correspondingly reduce targeted stress on the gate. In particular, in the illustrated example, the position of the spring members 170, 172 within the exterior gaps provides a compression force against the yoke assembly 104 at each of the legs 128a, 128b. In use, if the yoke is urged in the axial direction from a loading of the gate 122 by a process flow at the passageway 120 of the knife gate valve 100, the resiliency of one of the spring members 170, 172 can allow the yoke assembly 104—including the gate 122—to translate, rather than tilt, then resiliently return the yoke assembly 104 back to a neutral positon that is generally centered axially with respect to the first valve body portion 112 and the second valve body portion 116.

As further illustrated in FIG. 4, the length of the first barrel portion 186 of the first bushing 166 defines a first barrel length. The first barrel length is longer than the total thickness of the first clearance gap 196, the material thickness of the first side wall 134a (e.g., the material thickness associated with the first leg 128a), and the compressed thickness of the first spring member 170. Likewise, the length of the second barrel portion 190 of the second bushing 168 defines a second barrel length. The second barrel length is longer than the total thickness of the second clearance gap 198, the material thickness of the second side wall 136a, and the compressed thickness of the second spring member 172. In general, the lengths of the first and second barrel portions 186, 190 can thereby guarantee a compressive force is exerted on each of the first and second valve body portions 112, 116, thereby securing the valve body assembly 102 and fastening the yoke assembly 104 thereto.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system. In this regard, for example, some embodiments include methods to manufacture or install the knife gate valve 100, including according to operations expressly or implicitly disclosed above in the Detailed Description or the Summary.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A knife gate valve comprising:
   a first valve body portion on a first axial side of the knife gate valve;
   a second valve body portion on a second axial side of the knife gate valve, engaged with the first valve body portion to slidingly receive a knife gate;
   a yoke that includes a first leg extending on a first lateral side of the knife gate valve, and a second leg extending on a second lateral side of the knife gate valve, each of the first and second legs including: a first side wall on the first axial side of the knife gate valve, opposite the first valve body portion from the second valve body portion; and a second side wall on the second axial side of the knife gate valve, opposite the second valve body portion from the first valve body portion;
   a first clamp assembly that extends through the first leg, the first valve body portion, and the second valve body portion to secure the yoke to the first and second valve body portions on the first lateral side of the knife gate valve; and
   a second clamp assembly that extends through the second leg, the first valve body portion, and the second valve body portion to secure the yoke to the first and second valve body portions on the second lateral side of the knife gate valve;
   each of the first and second clamp assemblies including:
      a bolt;
      a first bushing on the first axial side of the knife gate valve;
      a second bushing on the second axial side of the knife gate valve;
      a first spring member arranged between the first bushing and the first valve body portion; and
      a second spring member arranged between the second bushing and the second valve body portion;
      the bolt extending through the first and second bushings, the first and second valve body portions, and the associated first or second leg of the yoke to apply a pressure-containing preload to the first and second valve body portions via the first and second bushings; and
      the first and second spring members being compressed by the bolt to apply a resilient spring force to the associated first or second leg of the yoke.

2. The knife gate valve of claim 1, wherein one or more of the first or second bushings of one or more of the first or second clamp assemblies includes:
   a barrel that extends through the associated first or second leg of the yoke to engage the associated first or second valve body portion; and
   a flange that extends radially from the barrel opposite the associated first or second leg from the associated first or second valve body portion.

3. The knife gate valve of claim 2, wherein the associated first or second spring member is seated between the flange and the associated first or second leg.

4. The knife gate valve of claim 1, wherein the bolt passes through the associated first and second spring members.

5. The knife gate valve of claim 1, wherein each of the first and second legs of the yoke exhibits a U-shaped cross section, with respective portions of each of the first and second valve body portions received within the U-shaped cross section in alignment with the first and second clamp assemblies.

6. The knife gate valve of claim 5, wherein the first and second valve body portions collectively define a first projection on the first lateral side of the knife gate valve and a second projection on the second lateral side of the knife gate valve;

wherein the first projection is received in the U-shaped cross section of the first leg of the yoke and receives the first clamp assembly; and wherein the second projection is received in the U-shaped cross section of the second leg of the yoke and receives the second clamp assembly.

7. The knife gate valve of claim 6, wherein the first and second valve body portions define a central slot that slidingly receives the knife gate and a top wall of the knife gate valve at the central slot; and wherein each of the first and second projections projects above the top wall.

8. The knife gate valve of claim 7, wherein each of the first and second projections includes a recessed portion at each of the first and second axial sides of the knife gate valve; and wherein the first and second legs extend into alignment with the recessed portions to be secured by the first and second clamp assemblies.

9. The knife gate valve of claim 1, wherein an axial gap is provided on the first lateral side of the knife gate valve, between the first leg and each of the first and second valve body portions, respectively, and an axial gap is provided on the second lateral side of the knife gate valve, between the second leg and each of the first and second valve body portions, respectively; and wherein each of the first and second spring members is arranged opposite the associated first or second leg from the associated axial gap.

10. The knife gate valve of claim 9, wherein, for each of the first and second clamp assemblies, on each of the first and second axial sides of the knife gate valve, a length of a barrel of the associated first or second bushing is longer than a total thickness of: the axial gap; the material thickness of the associated first or second leg; and a minimum, compressed thickness of the associated first or second spring member.

11. The knife gate valve of claim 1, wherein the first and second spring members of the first and second clamp assemblies permit the first and second legs to translate in the axial direction, upon loading of the gate by a process flow at the knife gate valve.

12. The knife gate valve of claim 1, wherein the yoke is fastened to the first and second valve body portions only by the first and second clamp assemblies.

13. The knife gate valve of claim 12, wherein each of the first and second clamp assemblies provides a pinned connection between the yoke and the first and second valve body portions.

14. The knife gate valve of claim 1, wherein one or more of the first or second spring members is a Belleville washer.

* * * * *